Sept. 18, 1945. W. S. PATTERSON 2,385,229
METHOD AND APPARATUS FOR PRODUCING BAGS
Filed Oct. 11, 1941 5 Sheets-Sheet 1
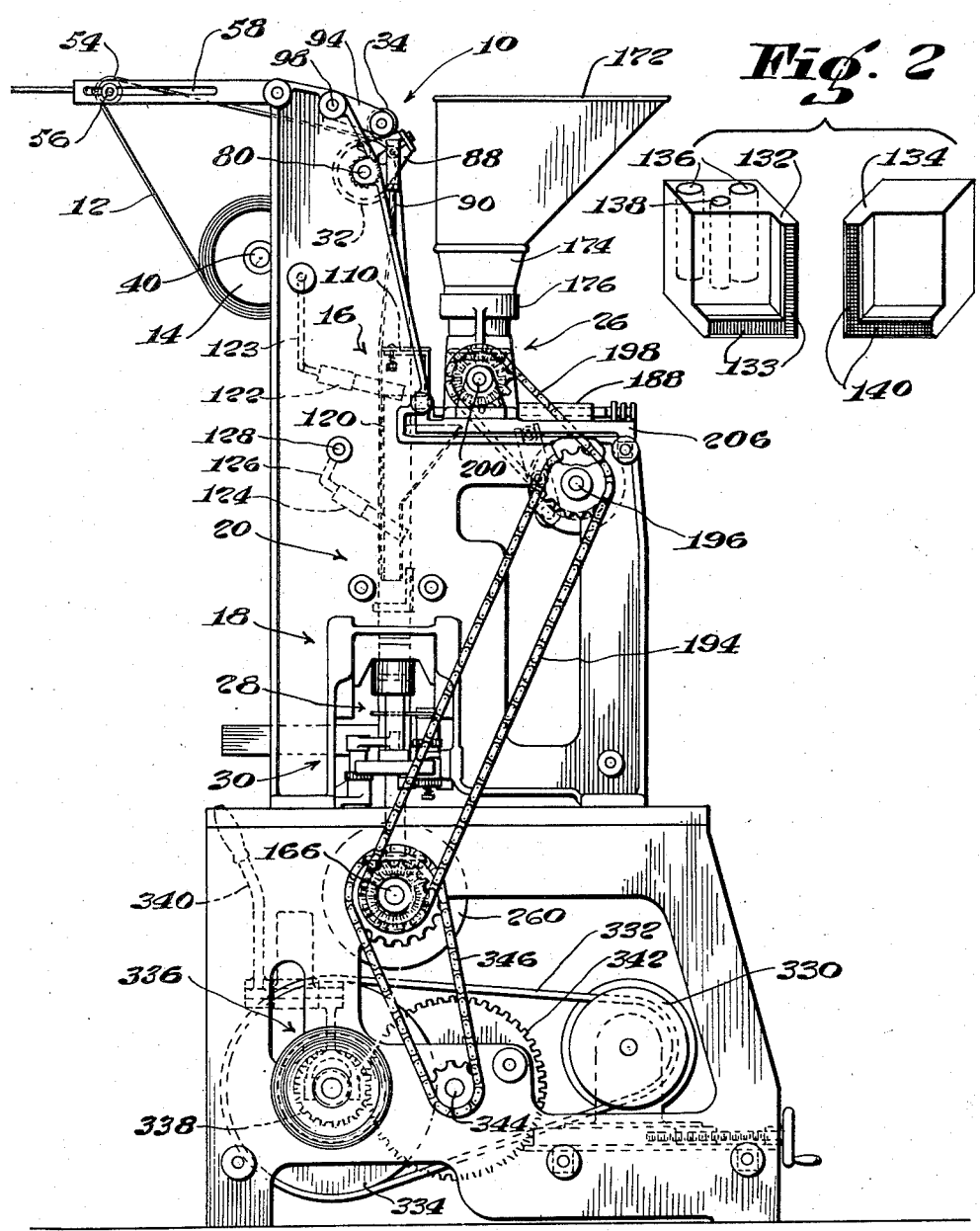
INVENTOR
William S. Patterson
BY J. Stanley Churchill
ATTORNEY Sept. 18, 1945. W. S. PATTERSON 2,385,229
METHOD AND APPARATUS FOR PRODUCING BAGS
Filed Oct. 11, 1941 5 Sheets-Sheet 3
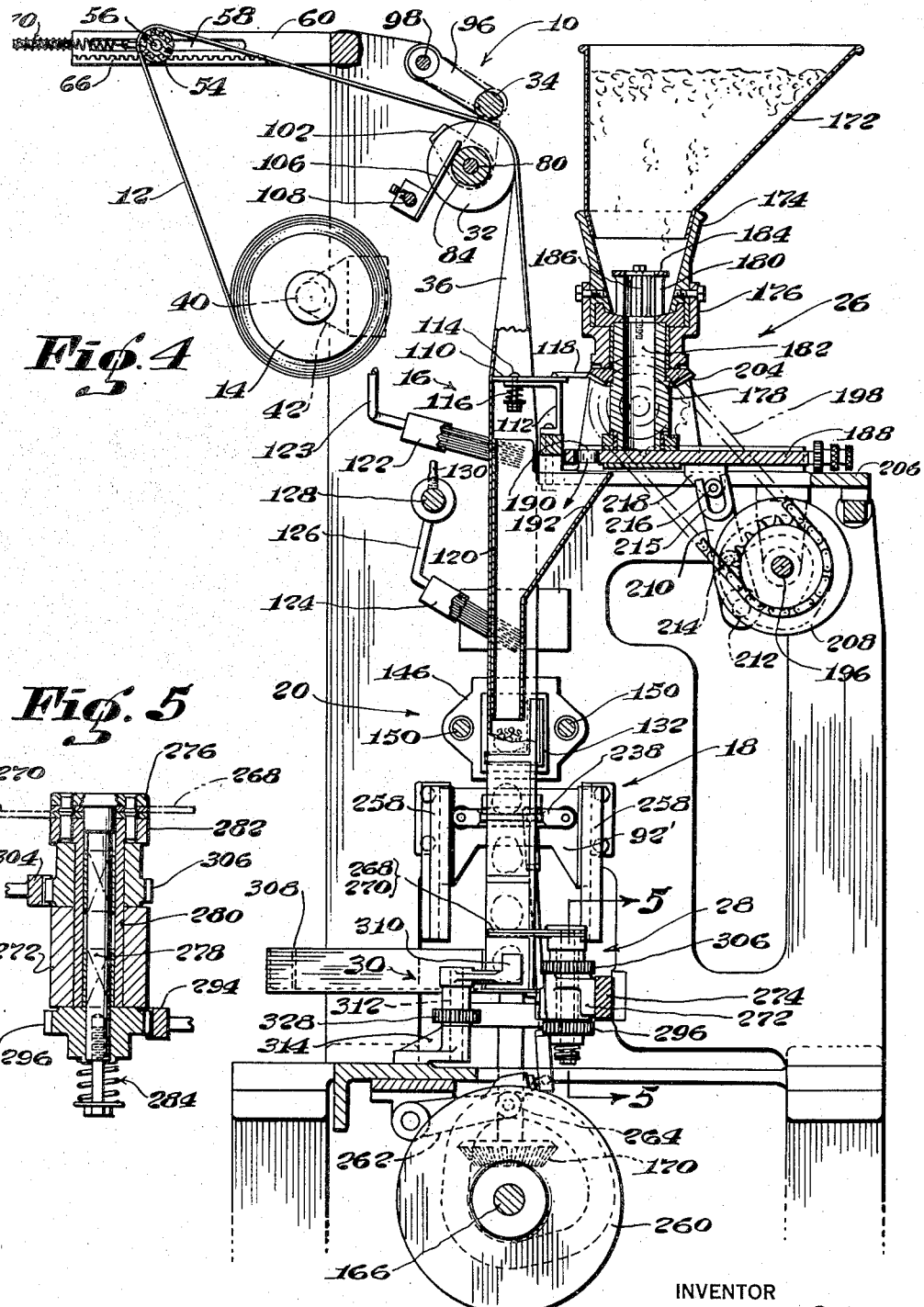
INVENTOR
William S. Patterson
BY J. Stanley Churchill
ATTORNEY Sept. 18, 1945.   W. S. PATTERSON   2,385,229
METHOD AND APPARATUS FOR PRODUCING BAGS
Filed Oct. 11, 1941   5 Sheets-Sheet 4

INVENTOR
William S. Patterson
BY J. Stanley Churchill
ATTORNEY

Sept. 18, 1945. W. S. PATTERSON 2,385,229
METHOD AND APPARATUS FOR PRODUCING BAGS
Filed Oct. 11, 1941 5 Sheets-Sheet 5
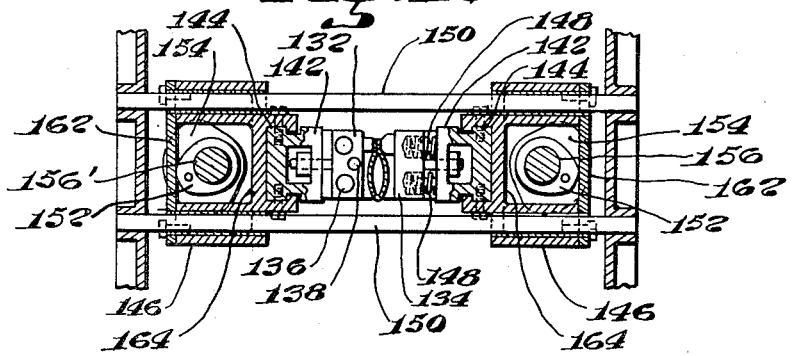
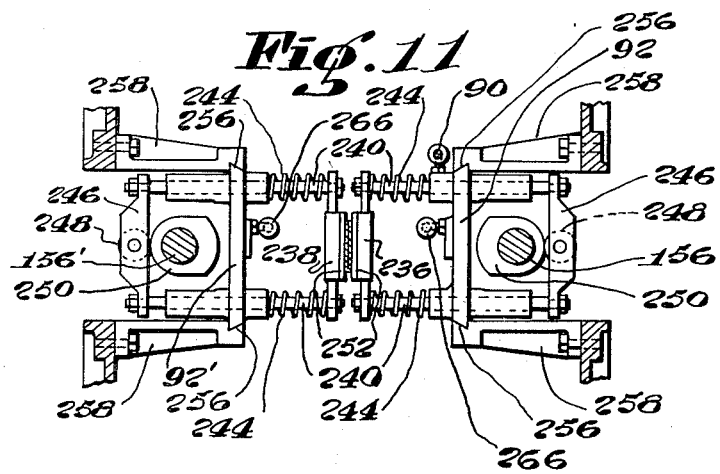
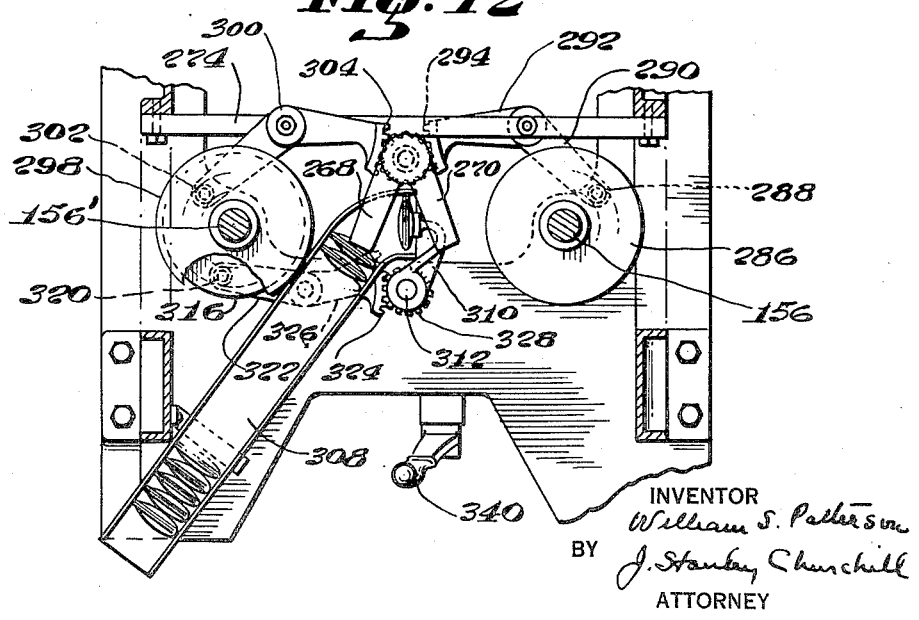
INVENTOR
William S. Patterson
BY J. Stanley Churchill
ATTORNEY Patented Sept. 18, 1945

2,385,229

UNITED STATES PATENT OFFICE 2,385,229

METHOD AND APPARATUS FOR PRODUCING BAGS

William S. Patterson, Arlington, Mass., assignor to Pneumatic Scale Corporation, Limited, Quincy, Mass., a corporation of Massachusetts Application October 11, 1941, Serial No. 414,640

14 Claims. (Cl. 93—3)

This invention relates to a method of and to apparatus for producing bags.

The invention has for an object to provide a novel method of and novel and improved apparatus for making and filling bags, and particularly paper tea bags, in an efficient, economical, rapid and practical manner.

With this general object in view and such others as may hereinafter appear, the invention consists in the method of and apparatus for producing bags, and in the various structures, arrangements and combinations of parts, hereinafter described and particularly defined in the claims at the end of this specification.

Figure 3:
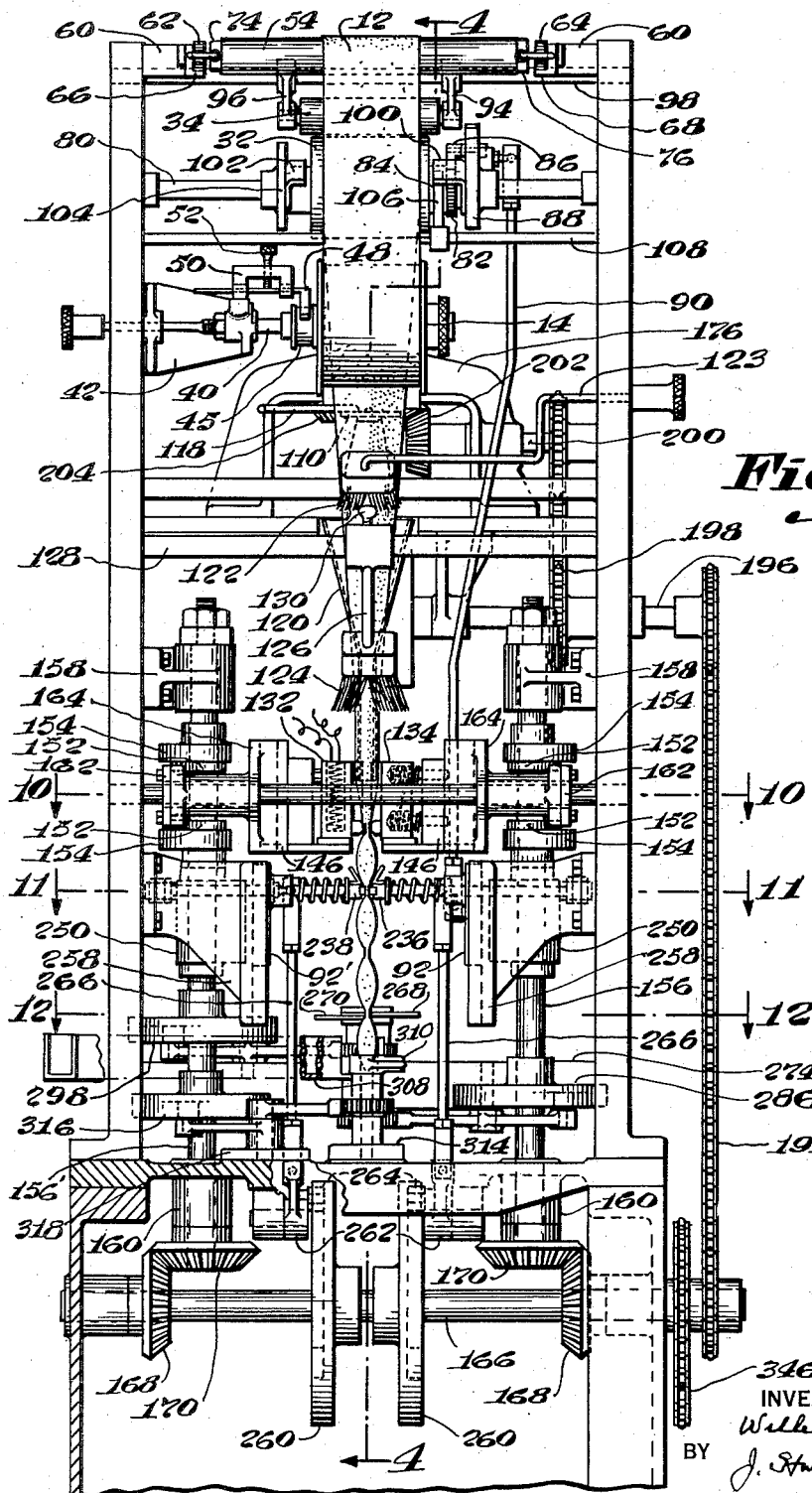
Figure 6:
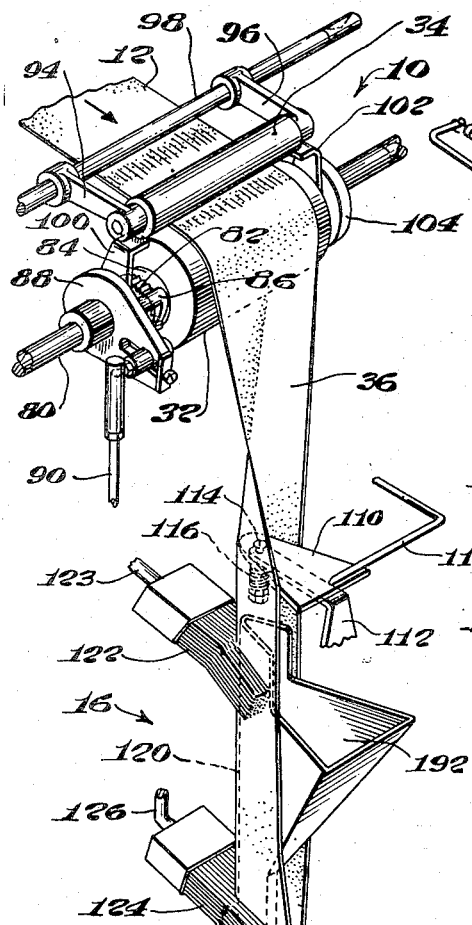
Figure 7:
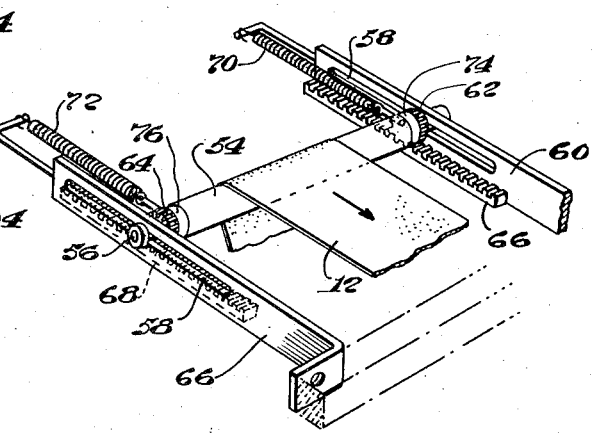
Figure 8:
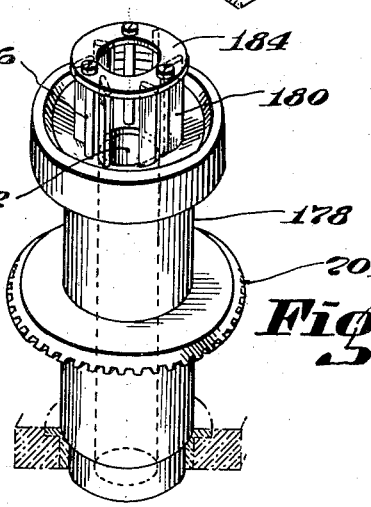
Figure 9:
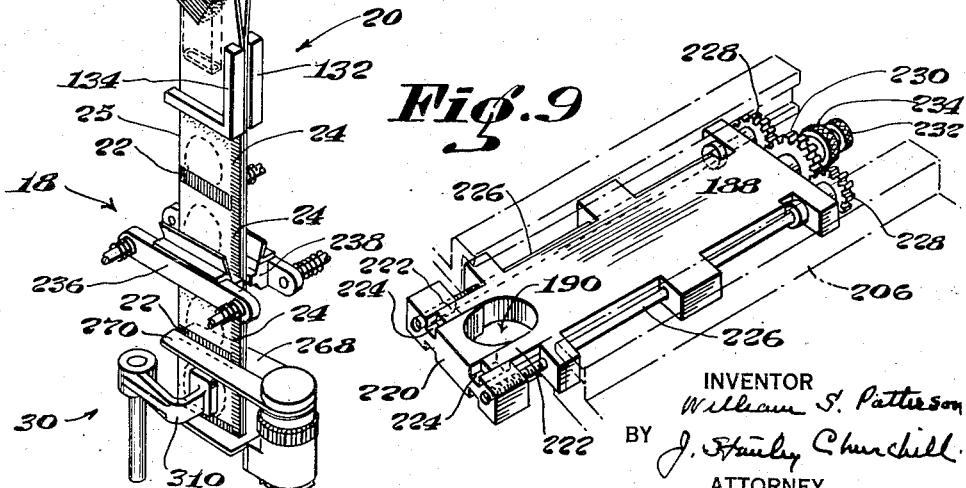

In the drawings illustrating the preferred embodiment of the invention, Fig. 1 is a side elevation of a bag forming and filling machine embodying the present invention; Fig. 2 is a perspective detail view of the bag sealing members to be referred to; Fig. 3 is a front elevation of the machine illustrated in Fig. 1; Fig. 4 is a longitudinal cross section of the machine taken on the line 4—4 of Fig. 3; Fig. 5 is a cross-sectional view taken on the line 5—5 of Fig. 4; Fig. 6 is a perspective view illustrating the present method of and preferred apparatus for forming and filling a tea bag; Figs. 7, 8 and 9 are detail views, in perspective, of the web takeup, tea distributing, and tea measuring devices, respectively, to be hereinafter more fully described; and Figs. 10, 11 and 12 are plan views, partly in cross-section, taken on the lines 10—10, 11—11, and 12—12 respectively of Fig. 3.

In general, the present invention contemplates a method and apparatus for making individual bags, such as tea bags, from an elongated web or strip of bag forming material. The bag forming material may and preferably will comprise a porous, fibrous material, such as filter paper, preferably impregnated with a thermoplastic, pressure responsive binding material so that adjacent edges and spaced transverse portions of a folded web may be joined together by the application of heat and pressure to form a strip of connected bag sections. In practice, such bag forming materials are relatively fragile and are subject to being torn or ruptured during mechanical handling of the material and during formation of the web into bag form. In accordance with one feature of the present invention, provision is made for feeding and advancing the bag forming material into heat sealing position, and for folding the material longitudinally during such advancement, in a manner such as to reduce to a minimum the liability of tearing or rupturing the material. In the preferred embodiment of the invention, the web is withdrawn from a roll of bag forming material by web withdrawing mechanism arranged to feed a length of the material in excess of that required to form one bag section. Simultaneously therewith or immediately thereafter, the portion of the web thus withdrawn from the roll is mechanically gripped and advanced a distance of one bag length past the shaping mechanism and into operative position to be heat sealed and to receive a charge of the tea or other commodity. Thus, during the web advancing cycle of operation of the machine, the portion of the web beyond the withdrawing mechanism and which is being drawn past the shaping mechanism is maintained in a relatively slack condition so that the strain or tension set up during withdrawal of the material from the roll, and, the strain exerted by the gripper mechanism in drawing the web past the shaping mechanism is separated or divided. Provision is also made in the preferred embodiment of the invention for drawing the web back to take up the slack therein, produced by such overdraft as described whereby to position the web in accurate relationship to the sealing members to form a bag section. Thus, the bag forming material is handled in the machine in a positive but gentle manner to produce accurately spaced bag sections with minimum liability of rupturing the fragile material.

Another feature of the present invention is the provision of novel and improved mechanism for forming, filling and sealing successive bag sections in strip form in accordance with the method disclosed in my copending application, Serial No. 333,895, filed May 8, 1940. As illustrated herein, provision is made for forming successive bag sections along a transverse zone and along an adjacent longitudinal zone simultaneously by L-shaped sealing members to form a bag section open on one side through which the tea or other commodity is deposited. Thereafter, a succeeding sealing operation is arranged to seal the open side of the bag section and to partially form a succeeding bag section. Provision is also made in the preferred embodiment of the invention for severing successive bag sections from the strip as the latter is advanced, and for depositing the severed bag sections into a delivery or stacking tray from which the finished tea bags may be conveniently removed to be packed for shipment.

Referring now to the drawings, in general, the present bag forming and filling machine is provided with web withdrawing mechanism, indicated generally at 10, arranged to withdraw a predetermined length or web of bag forming material 12 from a supply roll 14 thereof. The bag forming material preferably comprises a porous, fibrous material containing a thermoplastic, pressure-responsive, binding material so that when two layers or plies of the material are brought together and subjected to the application of heat and pressure, they will become and remain adhesively united. The web of bag forming material 12 is then advanced past bag forming mechanism, indicated generally at 16 which operates to fold the web longitudinally along a medial line to bring together the two half sections of the web preparatory to forming a strip of connected bags. The bag forming material is preferably drawn over the bag forming mechanism 16 by gripping and advancing mechanism indicated generally at 18 operative to advance the strip one bag length each cycle of operation of the machine and to present the strip in operative relation to bag sealing mechanism 20 arranged to simultaneously seal the strip along a transverse zone 22 and an adjacent longitudinal zone 24 during each sealing operation to form a succession of connected bag sections, closed on one side by the folded edge 25, and heat sealed along successive zones 22 and 24. Upon sealing a bag section along the transverse and longitudinal zones as above described, provision is made for introducing a predetermined amount of the commodity, such as tea through the open edge of the web and between the fold of a partially formed bag section. The bag filling mechanism, indicated generally at 26, is operative to deposit successive charges of the commodity into successive bag sections in timed relation to the operation of the strip advancing and heat sealing mechanisms, and, in the operation of the machine, the open top of a bag which has been provided with a charge of the commodity during one cycle of operation, is closed during a succeeding cycle of operation. The heat sealing and bag filling mechanisms are preferably timed to operate to seal the bottom and side of the bag immediately prior to the operation of filling the bag. Thereupon, the strip is intermittently advanced to bag severing mechanism, indicated generally at 28, which operates to sever the strip through successive transverse sealed portions to form individual filled and sealed bags. The individual bags thus severed may be disposed in a delivery chute along which they are advanced, in an upright position, by transfer mechanism, indicated generally at 30 operating in timed relation to the strip advancing means and the strip severing mechanism, as will be hereinafter more fully described.

In accordance with one feature of the present invention, the strain exerted upon the web 12 in withdrawing it from the supply roll 14 and the strain in advancing the web past the bag forming mechanism 16 are separated or divided so as to better enable the machine to handle fragile bag forming material in a manner such as to reduce to a minimum the liability of tearing or rupturing the material during the operation of the machine. Thus, in the operation of the machine, the web 12 is withdrawn from the supply roll 14 by the withdrawing mechanism 10 comprising a pair of cooperating rollers 32, 34 which distribute the pulling strain across the entire transverse area of the web during the withdrawing operation. The withdrawing mechanism is preferably arranged to withdraw a predetermined length of the web, exceeding slightly the amount required for one bag length, during each cycle of operation of the machine. Simultaneously therewith or directly after the withdrawing movement has been initiated, the gripping mechanism 18 operates to pull the strip downwardly for a distance of one bag section. Thus, in the operation of the machine, the portion of the strip or web 36 immediately beyond the withdrawing mechanism is always in a relatively slack condition during the strip advancing period of operation, so that the strain of pulling the strip downwardly is separated from the strain of withdrawing the web from the supply roll. Immediately thereafter, upon termination of the advancing period of operation, the web is drawn back to take up the slack and to dispose the strip in operative position to the heat sealing mechanism, as will be hereinafter described.

Referring now to Figs. 1 and 3, the supply roll 14 comprises a drum mounted to rotate upon a shaft 40 supported in a bracket 42 attached to the machine frame. Provision is preferably made for controlling the rotation of the drum to prevent inadvertent unwinding of the web, and, for this purpose, as herein shown, a friction brake, indicated generally at 44, is provided. The friction brake comprises a hub 45 formed integrally with the supply roll drum 14 and a brake shoe 48 supported in a bracket 50 and in frictional engagement with the hub 45. An adjusting screw 52, also supported in the bracket 50, is provided to engage the brake shoe 48 in order to adjust the pressure of the shoe against the hub.

In passing from the supply roll 14 to the web withdrawing mechanism 10, the web 12 is drawn over a take-up roller 54. As best shown in Figs. 4 and 7, the take-up roller is rotatably mounted on a shaft 56 supported by and axially movable in slots 58 provided in brackets 60 extending from the machine frame. The roller shaft 56 is provided with a pair of spur gears 62, 64, one at each end, arranged to engage with gear racks 66, 68 secured to the brackets 60, in order to maintain the shaft 56 parallel to the supply roll and the feed rolls during its horizontal movement. A pair of light coil springs 70, 72 attached to collars 74, 76 loosely mounted on the shaft 56, normally tend to urge the take-up roller 54 in a retracted position or in a left hand direction viewing Fig. 4. In the operation of the machine, when the web is advanced between the bight of the feed rollers 32, 34 to withdraw a length of the web, the take-up roller is drawn forwardly or to the right viewing Fig. 4, against the tension of the springs 70, 72 so that when the withdrawing period is terminated the take-up roller 54 is in an advanced position in the slotted brackets 60, the web being held taut by the frictionally held supply roller 14 at one end, and between the bight of the cooperating rollers 32, 34, one of said rollers 34 being movable into and out of cooperating engagement with the roller 32.

Thereupon, in the operation of the machine, after the gripper mechanism 18 has operated to advance the web one bag length as above described, the movable roller 34 is rocked out of engagement with the roller 32 thereby releasing the web and permitting the take-up roller to retract under the influence of the springs 70, 72 to take up the slack in the web beyond the feed rollers whereby to compensate for the overdraft of the web by the feed rollers 32, 34. Thus, it will be seen that the overdraft which has taken place during the feeding operation for the purpose of maintaining the portion of the web 36 disposed in advance of the feed rollers in a slack condition to permit the web to readily shape itself about the forming members upon downward movement of the grippers, is retracted the amount of the overdraft so that the net advance of the web will be one bag length. Thus, the web is accurately positioned with respect to the bag sealing mechanism whereby to produce bags of uniform length while at the same time providing for slackening of the web to relieve undue strain thereon during the web advancing operation.

Referring now to Figs. 3 and 6, the web withdrawing mechanism 10 comprises the driven roller 32 and the cooperating idler roller 34. The roller 32, which is rotatably mounted upon a cross shaft 80 journaled in the machine frame, is arranged to be intermittently rotated to advance the web 12 a predetermined length each cycle of operation by a pawl and ratchet mechanism. As herein shown, the ratchet 82 is secured to a hub 84 of the roller 32, and the cooperating pawl 86 is pivotally mounted in an oscillating pawl carrier 88, the latter being secured fast to the cross shaft 80. The pawl carrier 88 is arranged to be rocked to perform the withdrawing and web advancing operation through connections including a link 90, the latter being connected to one of the vertically reciprocated gripper supporting members 92 (see Fig. 11) to be hereinafter described. Thus, in operation, the downward pull on the web and the withdrawal operation occur simultaneously, although, as previously described, the amount of withdrawal is in excess of the amount required for a single bag length to produce the slack condition in the web, as desired.

The cooperating idler roller 34 is rotatably carried between arms 94, 96 which are pivotally mounted upon a cross shaft 98 secured in the machine frame. During the feeding or withdrawing operation, the roller 34 rests by its own weight against the web in cooperating engagement with the driven roller 32 to effect feeding of the web therebetween. Provision is made for rocking the roller 34 out of feeding engagement at the end of the feeding stroke so as to release the web and to permit the slack to be taken up as above described. For this purpose, as herein shown, a pair of angle brackets 100, 102 are provided which are arranged to engage the ends of the roller 34 at the end of the feeding stroke. One of the angle brackets 102 is secured to the flange of a hub 104 fast on the shaft 80, and the bracket 100 is secured to the flanged portion of the pawl carrier 88, as clearly illustrated in Fig. 3. In order to prevent the loosely mounted roller 32 from being rotated in a reverse direction during the retraction of the pawl carrier or during the take-up operation, a spring lever 106, carried upon a cross rod 108, is arranged to bear against the hub 84 of the roller in yielding and frictional engagement therewith. Thus, the relationship between the pawl 86 and its ratchet 82, movable with the roller 32, is not disturbed so that a uniform length of the web may be withdrawn during each cycle of operation.

Referring now to Figs. 3, 4 and 6, during the downward pull upon the web by the gripper mechanism 18, the web is drawn past the forming mechanism 16, which as herein shown, comprises a preliminary forming member or guide plate 110. The guide plate 110 is substantially U-shaped and is arranged to engage the web along a medial line longitudinally thereof to cause the sides of the web to be brought toward each other, as shown in Fig. 6, during the downward pull on the web. The preliminary forming member is preferably yieldingly mounted upon a bracket 112 attached to the machine frame, so as to permit the member to yield upwardly during the take-up or retracting movement of the web in order to prevent binding or rupturing thereof during such movement. As herein shown, a headed pin 114 extends through the member 110 and bracket 112 and is provided with a coil spring 116 to permit the movement described. The guide member is held from lateral displacement by a supporting rod 118 attached to a stationary part of the machine frame.

After passing the preliminary forming member 110, the web is engaged by a stationary filling tube 120 forming a part of the filling mechanism 26. The filling tube 120 is substantially V-shaped in cross section, and, as the web is drawn downwardly, the filling tube, in cooperation with a pair of stationary brushes 122, 124 the web is folded along its medial line into condition to be engaged by the sealing mechanism 20 for forming the sealed containers. As best shown in Figs. 3 and 4, the upper brush 122 is supported by an angular rod 123 extending from one of the side frames of the machine, and the lower brush 124 is mounted upon an arm 126 adjustably supported on a cross shaft 128. It will be observed, see Fig. 6, that the tube tapers slightly in a downward longitudinal direction so that the cross section of the tube adjacent the lower brush 124 is thinner than the preceding section. Thus, the sides of the web are gradually brought together, the brushes acting to gently wipe the web about the tube and providing a minimum of frictional resistance whereby relatively fragile material may be handled with a minimum of strain upon the bag forming material. The lower brush 124 may be adjusted to provide more or less pressure against the web by rocking the arm 126 in the desired direction and tightening the set screw 130.

Upon termination of the web advancing movement and after the slack has been taken up, the web is in position to be operated upon by the heat sealing mechanism 20, which, as best illustrated in Figs. 3, 4, and 11, comprises a pair of horizontally reciprocal, generally L-shaped sealing members 132, 134. One of the sealing members 132 (see Fig. 2) is preferably provided with electrical heating elements 136, the numeral 138 representing a thermostat unit to control the temperature of the sealing member. The face of the heated sealing member 132 is preferably serrated, as shown at 133. The cooperating sealing member 134 is not heated and is provided with a cloth covering or fabric pad upon its face as indicated at 140 against which the web is pressed during the sealing operation.

The sealing members 132, 134 are mounted upon similar brackets 142 adjustably fixed in vertical grooves 144 provided in slidingly mounted supporting brackets 146. One of the members 134 is yieldingly mounted upon its bracket 142, being provided with coil springs 148, as shown in Fig. 10 to permit the member 134 to adjust itself with respect to its cooperating member 132 during the sealing operation and to provide the desired pressure. The supporting brackets 146 are mounted to be horizontally reciprocated upon a pair of cross rods 150 by two pair of cams 152, 154 mounted fast upon similar vertical shafts 156, 156' journaled in bearings 158, 160 in the machine frame. One pair of cams 152 is arranged to bear against plates 162 secured to the outer ends of the slide brackets 146 to effect outward movement or separation of the slide brackets and the sealing members during the rotation of the shaft. The cams 154 are arranged to engage a vertical web 164 of each slide bracket 146 in order to effect inward movement of the slide bracket to present the sealing members into sealing engagement with the folded web. Thus, the sealing members 132, 134 are positively moved into and out of operative relation to the web to perform the sealing operation. The vertical cam shafts 156, 156' are arranged to be rotated from a main cam shaft 166 through similar bevel gear connections 168, 170, as illustrated in Fig. 3.

From the description thus far, it will be observed that the L-shaped sealing members effect sealing of the web along a transverse zone 22 and an adjacent longitudinal zone 24, the latter comprising the open edge of the folded strip, and that the folded edge 25 closes the opposite side of the bag section, leaving the edge of the strip open beyond the sealed portion and in communication with the open side of the partially formed bag section. Immediately upon engagement of the sealing members with the web, or directly thereafter, provision is made for depositing a charge of the commodity between the open edges of the web and into the partially formed bag section. As herein shown, the forming and filling tube 120 is arranged to receive a measured quantity of the commodity from the filling mechanism 26 and to guide the material into a partially formed bag section, the end of the filling tube extending into such bag section, as best shown in Fig. 4.

The illustrated mechanism 26 for feeding a commodity, such as tea, and for introducing a predetermined charge of the tea into the filling tube, as shown in Figs. 4, 8 and 9, comprises a feed hopper 172 which forms an extension of a collar 174 fixed in a bracket 176 attached to the machine frame. The tea feeding mechanism includes a rotary member shown in its entirety in Fig. 8 and comprises a hollow tube 178 rotatably supported in the bracket 176. The upper end of the tube 178 is provided with a plurality of vertically disposed and concentrically arranged feeding blades 180, set at a slight angle so that during the rotation of the tube, the blades operate to feed the tea into the aperture 182 of the hollow tube. As herein shown, the blades 180 are secured to a ring 184 supported from the tube 178 by bolts 186.

The lower end of the hollow tube 178 is in contiguous engagement with a horizontally reciprocal charging plate 188 provided with an adjustable opening 190, and, in the operation of the machine, the plate 188 is moved into a position to present the opening 190 in alignment with the hollow tube 178 to receive a charge of tea, and to be thereafter moved to present the opening over the funnel portion 192 of the forming and filling tube 120, as shown in Fig. 4, into which the measured quantity of tea falls by gravity.

As herein shown, the hollow tube 178 is arranged to be rotated through connections from the main cam shaft 166, including a chain and sprocket drive, indicated at 194, connecting the main cam shaft 166 with an auxiliary shaft 196, and a chain and sprocket drive 198 from the auxiliary shaft 196 to a short shaft 200 supported in the hopper bracket 176. The short shaft 200 is provided with a bevel gear 202 which meshes with a bevel gear 204 secured to the rotating tube 178. Thus, the tea feeding member is continuously rotated during the operation of the machine to positively feed the material and to provide a uniform body of tea in the hollow tube 178 from the bottom of which successive uniform charges of tea may be withdrawn.

The charging plate 188, which is slidably mounted in a slide bracket 206, is arranged to be reciprocated as described, in timed relation to the web advancing and the sealing mechanisms, by a cam 208 mounted fast on the auxiliary shaft 196 and a lever 210 pivoted at 212 in the machine frame. The lever 210 carries a cam roll 214 cooperating with the cam 208 and is provided with a bifurcated end 215 arranged to engage a roller 216 rotatably supported in a bracket 218 depending from the underside of the plate 188.

In the preferred embodiment of the invention, provision is made for adjusting the opening 190 in the plate 188, and, as best shown in Fig. 9, the end portion 220 is slidably mounted upon tongues 222 extending from the plate and which are received in grooves 224 provided in the end portions. The end portion 220 is arranged to be extended or retracted in order to enlarge or reduce the size of the opening 190 by threaded rods 226 received in threaded holes in the end portion. The rods 226 are arranged to be simultaneously rotated to effect the desired movement through connections including similar gears 228 provided on the ends of the rods 226 which mesh with an intermediate gear 230. The gear 230 may be manually rotated upon rotation of a knurled nut 232, a second knurled nut 234 being provided to lock the gear in its adjusted position.

From the description thus far it will be observed that in the operation of the machine a partially formed bag section sealed at its bottom and on one side is provided with a charge of tea leaving the upper transverse portion of the web open. Thereafter the web is advanced one bag length as above described whereupon a succeeding sealing operation closes the open side of the preceding bag and partially forms a new bag to be provided with a charge of the commodity. The mechanism 18 for advancing the strip one bag length, as herein shown, see Figs. 3 and 11, comprises a pair of gripper members 236, 238 mounted to be horizontally reciprocated into and out of engagement with the web, and also to be vertically reciprocated a distance of one bag length. As shown in Fig. 11, the gripper members 236, 238 are horizontally supported upon two pairs of rods 240, each pair being slidably mounted in similar supporting brackets 92, 92'. Each rod 240 is provided with a coil spring 244 disposed between the brackets 92, 92' and their respective gripping members which tend to urge the gripper members toward each other and into engagement with the web. Each pair of rods 240 is joined at its outer ends by tie pieces 246 which carry rollers 248 arranged to cooperate with similar elongated cams 250 secured to the vertical cam shafts 156, 156'. Thus, in the operation of the machine, the gripper members 236, 238 are horizontally reciprocated into and from engagement with the web, the springs 244 effecting a yielding engagement therewith, and the cams 250 operating to positively separate the grippers. The grippers may and preferably will be provided with a relatively soft facing 252 such as rubber or cloth in order to gently engage the web, and, as shown in Fig. 3, the upper portion of each gripper is provided with an angular guide member 254.

The gripper supporting brackets 92, 92' are arranged to be vertically reciprocated in grooves 256 provided in supporting members 258 attached to the machine frame so as to bodily move the gripping units one bag length and return during each cycle of operation of the machine. As herein shown, the gripping units are reciprocated in the members 258 by similar cams 260, secured to the main cam shaft 166, and through connections including cam levers 262, cooperating rollers 264 and links 266. It will be observed that the cams 250 for effecting the horizontal movement are elongated so that the rollers 248 are in engagement with their respective cams during the vertically reciprocating movement above described. In operation, the grippers are arranged to grasp the web at the transverse sealed area of a connected bag section immediately below the sealing mechanism whereupon the strip is moved down one bag length. The grippers are then separated and returned to a position in alignment with a succeeding sealed portion in readiness to grasp the web for a succeeding cycle of operation.

Referring now to Figs. 3, 4, and 12, the strip severing mechanism 28 comprises a pair of shears 268, 270 arranged to sever the endmost bag section from the strip to form an individual filled and sealed bag. In the operation of the machine, the strip advancing mechanism 18 operates to present the endmost bag section into operative position with relation to the shears so as to effect severance of the strip through the connecting transverse sealed portion 22. The shearing unit is mounted in a bearing bracket 272 mounted upon a cross bar 274 attached to the machine frame. As herein shown, see Fig. 5, the upper shear blade 268 is riveted to a flanged portion 276 formed at the upper end of a central shaft 278 which is rotatably mounted in a bushing or hollow shaft 280 in turn rotatably supported in the bearing bracket 272. The lower shear blade 270, mounted to cooperate with the upper blade 268, is riveted to a flanged portion 282 formed on the upper end of the hollow shaft 280. A coil spring 284 provided at the lower end of the central shaft 278 is arranged to yieldingly maintain the upper shear in cooperative engagement with the lower shear as clearly shown in Fig. 5.

The upper and lower shear blades 268, 270 are arranged to be individually operated, and, as herein shown, the upper blade 268 is arranged to be oscillated by a cam 286 fast on one of the vertical cam shafts 156. A cooperating cam roll 288 is carried by one arm 290 of a two armed lever, pivotally supported in the cross bar 274, the second arm 292 being provided with a gear segment 294 arranged to mesh with a gear 296 fast on the lower end of the central shaft 278. The lower shear blade 270 is arranged to be oscillated in cooperation with the upper blade by a similar cam 298 fast on the opposite vertical shaft 156'. The two-armed lever 300 carries a cooperating cam roll 302 on one arm and a gear segment 304 upon the second arm, the latter being arranged to mesh with a gear 306 secured to the hollow shaft 280. Thus, in the operation of the machine, successive endmost bag sections are severed from the strip as the latter is advanced by the gripper mechanism.

During the strip advancing operation, the strip is brought to rest with the endmost bag section deposited in a delivery chute 308 so that when the endmost bag section is severed as above described, the individual bag is positioned upright in the receiving end of the chute, as shown in Fig. 4. Immediately upon severance of an endmost bag section, the bag transferring mechanism 30 operates to advance the bag from its severed position, along the chute, and into engagement with the previously severed bags which are stacked upright in the chute for convenience in removing the finished bags from the chute. The delivery chute or stacking tray 308 is preferably arranged to frictionally engage the side edges of the bags so as to maintain the latter in an upright condition. As illustrated in Figs. 3 and 12, the transfer mechanism comprises a pusher arm 310 fast upon a vertical shaft 312 rotatably mounted in a bracket 314 attached to the machine frame. The arm 310 is arranged to be rocked by a cam 316 fast on the vertical shaft 156'. A two-armed lever, pivotally mounted in a bracket 318 attached to the machine frame, carries a cooperating cam roll 320 in one arm 322 and is provided with a gear segment 324 on its second arm 326. The gear segment is arranged to mesh with a gear 328 fast on the rock shaft 312.

Referring now to Fig. 1, the driving mechanism includes an electric motor 330 connected by a belt 332 to a pulley 334 forming part of a clutch mechanism indicated generally at 336 and arranged to be engaged to drive a gear 338 upon movement of the clutch handle 340. The gear 338 meshes with a gear 342 fast on a shaft 344 which latter is connected by a chain and sprocket drive 346 to the main cam shaft 166.

While the preferred embodiment of the invention has been herein illustrated and described, it will be understood that the invention may be embodied in other forms within the scope of the following claims.

Having thus described the invention, what is claimed is:

1. In the method of making and filling bags, the steps comprising feeding a web of bag forming material an amount in excess of that required for one bag length to form a relatively slack portion, then drawing the slack portion of the web a distance of one bag length only while folding the web longitudinally, retracting the slack portion of the web an amount equal to the excess length fed while controlling the leading end of the web to cause the web to become relatively taut, sealing the web to form a bag section open on one side, providing the partially formed bag section with a charge of a commodity, and then sealing the open side of the bag section.

2. In a method of making and filling bag sections successively formed in a web, the steps comprising successively feeding a web of bag forming material an amount in excess of that required for one bag length to form a relatively slack portion, advancing the web a distance of one bag length and during such advancement folding the web longitudinally, retracting the slack portion of the web an amount equal to the excess length fed while controlling the leading end of the web to cause the web to become relatively taut, sealing the web to form a bag section open at one side, introducing a commodity into each bag section, sealing the bag section and thereafter pulling the filled and sealed bag sections through one bag length and severing the web between successive bag sections.

3. In the method of making and filling tea bags from a web of bag material, the steps comprising unwinding a predetermined length of the web from a supply roll thereof, such length being in excess of that required for forming a single bag section in the web to form a relatively slack portion, gripping the web and advancing such slack portion thereof a distance of one bag length only, folding the web longitudinally during such advancement, retracting the slack portion of the web the amount of the overdraft for one bag section while controlling the leading end of the web to dispose the web in a relatively taut condition and sealing the folded web along a transverse and an adjacent longitudinal portion, filling the partially formed bag section with a charge of a commodity, and thereafter sealing the web along a second transverse portion to completely seal and close the bag section.

4. In the method of making and filling tea bags from a web of heat sealable bag forming material, the steps comprising unwinding a predetermined length of the web from a supply roll thereof, such length being in excess of that required for forming a single bag section in the web to form a relatively slack portion, drawing such slack portion of the web a distance of one bag length only, folding the web longitudinally along a medial line, retracting the slack portion of the web the amount of the overdraft for one bag section while controlling the leading end of the web to dispose the web in a relatively taut condition and sealing the web simultaneously along a transverse portion and along an adjacent longitudinal portion by the application of heat and pressure to form a bag section open on one side, filling the partially formed bag section with a charge of a commodity, repeating the above operations to form successive filled bag sections, successive sealing operations operating to seal the open edge of a preceding bag section and to partially form another bag section, and severing successive bag sections.

5. In a bag making and filling machine, bag forming mechanism comprising an elongated forming member V-shaped in cross section, means for drawing the web over said forming member, and a brush arranged to cooperate with said forming member to fold the sides of the web about the forming member to form a V-shaped strip.

6. In a machine of the character described, in combination, means for forming a web of bag making material into the form of a strip having a closed bottom and open top, reciprocatory means for sealing the bag forming material of such strip throughout two zones simultaneously, one zone extending transversely of the web and the other zone extending longitudinally of the web adjacent the edges thereof to form a bag section open at one side, bag filling means, and means for advancing the web one bag length in operative position for a second sealing operation to close the first bag section and to form a second bag section open at one side.

7. In a machine of the character described, in combination, a supply roll, and means for withdrawing a predetermined length of bag forming material from said supply roll comprising a driven roller and a cooperating idler roller, means for intermittently rotating said driven roller to feed a length of bag forming material in excess of the amount required for one bag length to form a relatively slack portion, means for moving said idler roller out of cooperating engagement at the end of the feeding cycle, and means for retracting the web the amount of such slack upon removal of said idler roller, said last named means comprising a spring tensioned roller mounted for lateral movement, a pair of spur gears one secured at each end of said roller, and a pair of stationary racks with which said gears are arranged to cooperate whereby to maintain the axis of said roller parallel to the web during said lateral movement.

8. In a machine of the character described, in combination, means for folding a web of bag forming material longitudinally, means for sealing the web along transverse and longitudinal zones simultaneously to form successive bag sections, and means for intermittently advancing the web, comprising a pair of horizontally reciprocal cooperating gripper members movable into and out of engagement with said web and disposed with relation to said sealing means so as to engage the web at successive transverse sealed zones and means for vertically reciprocating said gripper members bodily to advance said web one bag length during each cycle of operation.

9. In a machine of the character described, in combination, means for folding a web of bag forming material longitudinally to form a V-shaped strip, reciprocatory means for sealing adjacent faces of the web to form a chain of successive bag sections, bag filling means, means for intermittently advancing the web a distance of one bag length each cycle of operation comprising a pair of cooperating gripper members movable into and out of operative engagement with the web, and means for vertically reciprocating said gripper members to advance said web one bag section during each cycle of operation.

10. In a machine of the character described, in combination, means for folding a web of bag forming material longitudinally to form a V-shaped strip, reciprocatory means for sealing adjacent faces of the web to form a chain of successive bag sections, bag filling means, means for intermittently advancing the web a distance of one bag length each cycle of operation comprising a pair of cooperating gripper members movable into and out of operative engagement with the web, and means for vertically reciprocating said gripper members to advance said web one bag section during each cycle of operation, and means for severing successive filled and sealed bag sections from the web.

11. In a bag making and filling machine, in combination, means for supporting a roll of flexible bag forming material, means for longitudinally folding the web withdrawn from said roll to form a V-shaped strip, bag filling means, sealing mechanism, including cooperating sealing members for engaging and pressing between them the opposite surfaces of the folded web to seal adjacent faces thereof, means for effecting heating of one of said sealing members, the other sealing member being resilient, and operating mechanism for moving the sealing members into and from web engaging position, and mechanism for intermittently drawing the folded web past the sealing members while the latter are in an inoperative position.

12. In a bag making and filling machine, in combination, web folding means for folding a web longitudinally to form a V-shaped strip, reciprocatory sealing means operative to seal adjacent faces of the bottom and unfolded side of a bag section of the folded web simultaneously, and filling means for introducing a commodity into the bag section through the unsealed top thereof, said filling means being arranged to operate after said sealing means.

13. In the method of making and filling bags, the steps comprising feeding a web of bag forming material an amount in excess of that required for one bag length to form a relatively slack portion in the web, then drawing a part of the slack portion while folding the web longitudinally, retracting the remainder of the slack while controlling the leading end of the web to cause the web to become relatively taut, sealing the folded web to form a bag section open on one side, providing the partially formed bag section with a charge of a commodity, and then sealing the open side of the bag section.

14. In a bag making and filling machine, in combination, web advancing means comprising means for advancing a predetermined length of bag forming material in excess of the amount required for one bag length to form a relatively slack portion, means for drawing the slack portion of the web a distance of one bag length only over bag folding means, means for retracting the slack portion of the web the amount of the excess over one bag length which has previously been advanced while controlling the leading end of the web to dispose the web in a relatively taut condition, and bag sealing means operative to seal all but one portion of the folded web to form a bag section, and filling means operative to fill said formed bag section, said sealing means being thereafter operative to seal the aforesaid unsealed portion of the bag section.

WILLIAM S. PATTERSON.